Nov. 15, 1927.
W. A. GORDON
FORCE FEED LUBRICATOR
Filed June 14, 1926
1,649,026
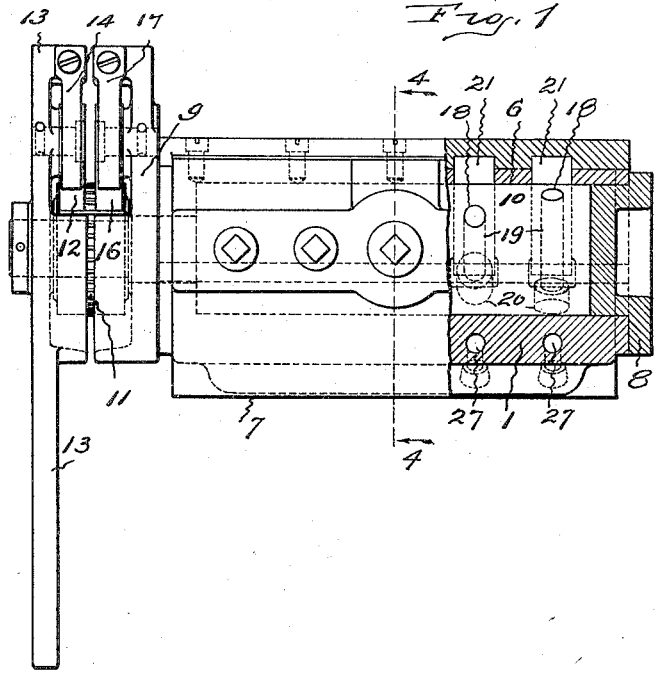
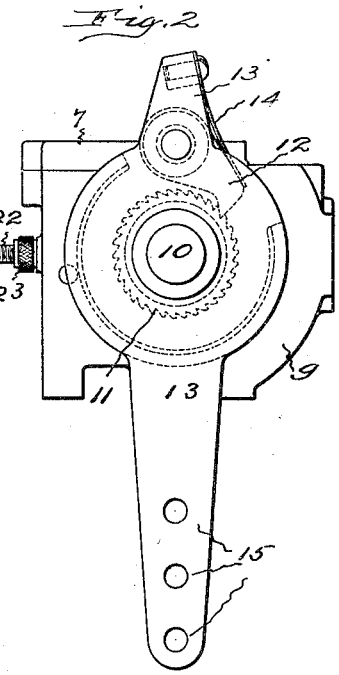
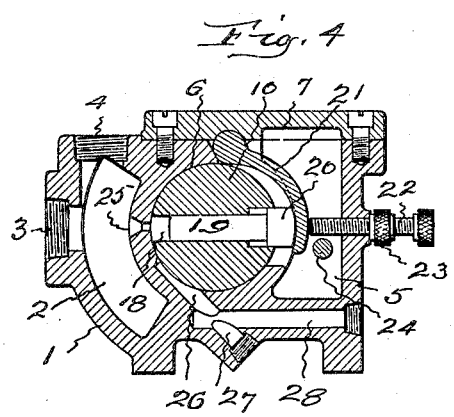
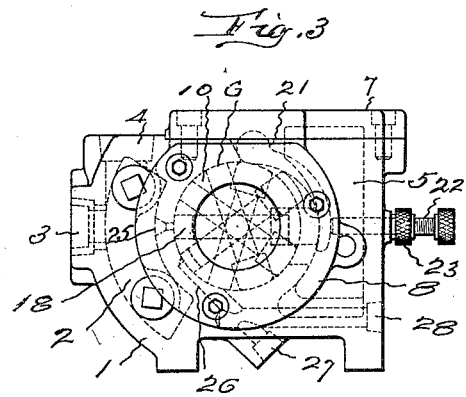
INVENTOR
William A. Gordon,
Harry R. Williams
Atty.

Patented Nov. 15, 1927.

1,649,026

UNITED STATES PATENT OFFICE.

WILLIAM A. GORDON, OF SHELTON, CONNECTICUT.

FORCE-FEED LUBRICATOR.

Application filed June 14, 1926. Serial No. 115,791.

This invention relates to a force feed lubricator which is more particularly designed for pumping non-fluid oils and greases to different bearings of machines which require lubrication.

The object of the invention is to provide a unitary device operated from a single source of power which may be readily adjusted to independently regulate the volume of heavy lubricant pumped to different discharge openings, whereby each bearing of a machine may be supplied with the exact necessary amount of lubricant.

The embodiment of the invention illustrated has a rotor contained in a cylinder within a casing. The rotor has a plurality of plungers that are each individually forced forward by its own cam that is adjustably mounted in the casing. The lubricant is fed under pressure into a common chamber in the casing and passes therefrom through suitably arranged ports in the cylinder wall to spaces in front of the plungers and as the rotor is rotated the cams push the plungers forward and cause them to force the lubricant that is in front of them through the several discharge ports that connect the cylinder with passages which lead through the casing.

In the accompanying drawings Fig. 1 shows a front elevation, with parts broken away to expose the interior, of a lubricating pump that embodies the invention. Fig. 2 is a view of one end of the device. Fig. 3 is a view of the other end. Fig. 4 is a transverse section on the plane indicated by the dotted line 4—4 on Fig. 1.

The casing 1 has along one side a chamber 2 into which the heavy lubricant is forced through either the intake port 3 or the intake port 4, whichever is most convenient, by any common means and at any desired pressure, ordinarily the heavier the lubricant the greater the pressure. These intake openings are threaded for the connection of pipes from the lubricant supply, and the opening not used is plugged. The casing also contains a chamber 5 along the other side in which oil for lubricating the parts of the device itself may be placed. In the center of the chamber and extending its entire length is the cylinder 6. The top of the casing is closed by a removable cover 7, and one end of the cylinder is closed by a cap 8 and the other end of the cylinder is closed by a cap 9 which cylinder covers are removably secured to the casing.

In the cylinder is the rotor 10. On one end of the rotor a ratchet wheel 11 is keyed. Engaging this ratchet wheel is a pawl 12 which is pivoted to a lever 13 that is free to turn on the end of the rotor. A spring 14 tends to keep the pawl carried by the lever in engagement with the ratchet teeth. The lever has a number of holes 15 which provide means for the connection of the lever to any rotating or reciprocating part which is employed for oscillating the lever and causing the pawl to transmit an angular step by step movement through the ratchet wheel to the rotor. By adjusting whatever connection is used from the driving mechanism to the different points of the lever the amount of this angular movement or the number of revolutions per minute given to the rotor may be varied as desired. A pawl 16 is pivoted on the cylinder cap 9, and is held in engagement with the ratchet teeth by a spring 17 to prevent any backward movement of the rotor.

In the rotor shown there are five diametrically drilled holes 18 which holes are shown as extending through the rotor at angles differing by 36°. The rotor may be provided with any desired number of these holes and they need not be drilled at different degrees, but it is preferred that they shall be, so that the strains of forcing the lubricant out of the cylinder will be equally distributed throughout the revolutions of the rotor.

In each of these diametrically drilled holes in the rotor is a plunger 19 that preferably has a head 20 at one end. These plungers are preferably the same length as the diameter of the rotor.

Mounted in the casing in the planes of rotation of the plungers and adapted to be swung in peripheral slots in the cylinder walls are cam levers 21 adapted to be engaged by the plunger heads. These cams, which are retained in place by the casing cover are curved and their inner walls are shaped to the same arcs as the sections of the cylinder wall they displace.

In the side of the casing opposite each of these cam levers is an adjustable stop screw 22 that is adapted to be secured in place by a lock nut 23. These screws are designed to engage the outer surface of the cam levers and determine the amount of their outward movement during the operation of the pump. A rod 24 is extended from end to end of the casing in the chamber 5 to prevent the cam levers from opening so far as to allow the plungers to slip out of place and catching and wrecking the device.

A port 25 is made through the cylinder wall in the plane of rotation of each of the plungers, to provide communication from the chamber 2 to each of the plunger holes, and a port 26 is also made through the cylinder wall to the communicating discharge passages 27, 28 in casing in the plane of rotation of each of the plungers. Two discharge passages with threaded outer ends are desirably supplied for each discharge port in order that the tubes leading to the bearings to be lubricated may be most conveniently connected with the pump. The passage that is not used is plugged.

When this powerful, rugged, easily adjusted pump is put to use the lever 13 is connected with the operating mechanism so as to impart the desired step by step angular movement and speed to the rotor 10, and the lubricant is forced into the receiving chamber 2 under the necessary pressure, which of course depends upon the character of the lubricant. As the rotor turns and a plunger 19 comes opposite a port 25 the lubricant under pressure in the receiving chamber flows through that port and presses back that plunger until it is stopped by its cam 21, the lubricant occupying the space left at the front end of the plunger.

As the rotor continues to revolve the cam pushes the plunger forward and causes it to force the lubricant in front of it out through the port 26 to the discharge passage that is open. The quantity of lubricant that is delivered may first be varied by regulating the speed and angular movement of the oscillations of the lever that turns the rotor, and then the amount of lubricant that is forced to any particular bearing is further determined by the position of the cam that engages the plunger which forces the lubricant to such bearing. The stop screws 22 may be independently set so that the cams will coincide with the wall of the cylinder, in which case no lubricant will be forced to any bearing, or the screws may be set so that the cams will force the plungers their full movement and a full quantity of lubricant pumped, or the amount of lubricant pumped may be varied for each bearing, there being a widely different setting for each cam which determines the plunger movement and thus controls the amount of lubricant received and forced to the several bearings.

The invention claimed is:

1. A force feed lubricator for heavy lubricant comprising a casing containing a cylinder, a rotor turning in the cylinder, means for turning the rotor, a plurality of plungers carried by and movable diametrically of the rotor, a cam supported by the casing in the plane of revolution of and adapted to engage each plunger, and means for adjusting the relation of said cams to the plungers said cylinder having an intake port and a discharge port in the plane of revolution of each plunger.

2. A force feed lubricator for heavy lubricant comprising a casing containing an intake chamber and a cylinder with a plurality of ports from said chamber to the cylinder, a rotor turning in the cylinder, means for turning the rotor, a plurality of plungers carried by and movable diametrically of the rotor in the plane of said ports, a cam supported by the casing in the plane of revolution of and adapted to engage each plunger, and means for adjusting the relation of said cams to the plungers, said cylinder having a discharge port in the plane of revolution of each plunger.

3. A force feed lubricator for heavy lubricant comprising a casing containing an intake chamber along one side, a lubricating chamber along one side and a cylinder with a plurality of intake ports from said chamber to the cylinder, a rotor turning in the cylinder, means for turning the rotor, a plurality of plungers carried by and movable diametrically of the rotor in the plane of said ports, a cam supported by the casing in the plane of revolution of and adapted to engage each plunger, and means for adjusting the relation of said cams to the plungers, said cylinder having a discharge port in the plane of revolution of each plunger.

4. A force feed lubricator for heavy lubricant comprising a casing containing a cylinder, a rotor turning in the cylinder, a ratchet and pawl mechanism for turning the rotor, a plurality of plungers carried by and movable diametrically of the rotor, a cam supported by the casing in the plane of revolution of and adapted to engage each plunger, and means for adjusting the relation of said cams to the plungers, said cylinder having an intake port and a discharge port in the plane of revolution of each plunger.

5. A force feed lubricator for heavy lubricant comprising a casing containing a cylinder, a rotor turning in the cylinder, means for turning the rotor, a plurality of plungers carried by and movable diametrically of the rotor, a swinging cam supported by the casing in the plane of revolution of and adapted to engage each plunger, and means for adjusting the relation of said cams to the plungers, said cylinder having an intake port and a discharge port in the plane of revolution of each plunger.

6. A force feed lubricator for heavy lubricant comprising a casing containing a cylinder, a rotor turning in the cylinder, means for turning the rotor, a plurality of plungers carried by and movable diametrically of the rotors, a cam supported by the casing in the plane of revolution of and adapted to engage each plunger, and stop screws for adjusting the relation of said cams to the plungers, said cylinder having an intake port and displaced but in the plane of revolution of the plunger.

7. A force feed lubricator for heavy lubricant comprising a casing containing a cylinder, a rotor turning in the cylinder, means for turning the rotor, a plurality of plungers carried by and movable diametrically of the rotor, a cam having a curved surface conforming with the curve of the cylinder, supported by the casing in the plane of revolution of and adapted to engage each plunger, and means for adjusting the relation of said cams to the plungers, said cylinder having an intake port and a discharge port in the plane of revolution of each plunger.

8. A force feed lubricator for heavy lubricant comprising a casing containing a cylinder, a rotor turning in the cylinder, means for turning the rotor, a plurality of plungers carried by and movable diametrically of the rotor, a swinging cam supported by the casing in the plane of revolution of and adapted to engage each plunger, individual set screws extending through the casing for determining the opening movement of said cams, and a common rod for preventing the cams from opening too far, said cylinder having an intake port and a discharge port in the plane of revolution of each plunger.

9. A force feed lubricator for heavy lubricant comprising a casing containing a cylinder, a rotor turning in the cylinder, means for turning the rotor, a plurality of plungers carried by and movable diametrically of the rotor in various angular relations, a cam supported by the casing in the plane of revolution of and adapted to engage each plunger, and means for adjusting the relation of said cams to the plungers, said cylinder having an intake port and a discharge port in the plane of revolution of each plunger.

10. A force feed lubricator for heavy lubricant comprising a casing containing a cylinder, a rotor turning in the cylinder, means for turning the rotor with a step by step movement, a plunger carried by and movable diametrically of the rotor, a cam supported by the casing in the plane of revolution of and adapted to engage said plunger, and a set screw for adjusting the relation of said cam to the plunger, said cylinder having an intake port and a discharge port angularly displaced but in the plane of revolution of the plunger.

11. A force feed lubricator for heavy lubricant comprising a casing containing a cylinder with intake and discharge ports, a rotor turning in the cylinder, means for turning the rotor, a plurality of individual plungers carried by and movable transversely of the rotor, individual cams supported by the casing in the plane of revolution of and adapted to engage the plungers, and means for adjusting the relation of said cams to the plungers.

12. A force feed lubricator comprising a casing containing a cylinder, a rotor turning in the cylinder, means for turning the rotor, a plunger carried by and movable diametrically in the rotor, an intake port to the cylinder in the plane of rotation of the plunger whereby at an interval during the rotation of the rotor lubricant may be forced through said intake port and press back the plunger, a discharge port from the cylinder in the plane of rotation of the plunger, and a cam adapted to engage the plunger and at an interval during the rotation of the rotor cause it to force lubricant out through said discharge port.

WILLIAM A. GORDON.